(12) United States Patent
Alfarhan et al.

(10) Patent No.: US 12,279,140 B2
(45) Date of Patent: *Apr. 15, 2025

(54) POWER EFFICIENT MEASUREMENTS AT HIGHER FREQUENCIES

(71) Applicant: InterDigital Patent Holdings, Inc., Wilmington, DE (US)

(72) Inventors: Faris Alfarhan, Montreal (CA); Ghyslain Pelletier, Montreal (CA); Moon-il Lee, Melville, NY (US); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/679,601

(22) Filed: May 31, 2024

(65) Prior Publication Data

US 2024/0314605 A1 Sep. 19, 2024

Related U.S. Application Data

(63) Continuation of application No. 18/642,172, filed on Apr. 22, 2024, which is a continuation of application
(Continued)

(51) Int. Cl.
H04W 24/08 (2009.01)
H04B 17/318 (2015.01)

(52) U.S. Cl.
CPC .......... H04W 24/08 (2013.01); H04B 17/318 (2015.01)

(58) Field of Classification Search
None
See application file for complete search history.

(56) References Cited

U.S. PATENT DOCUMENTS

| 8,462,736 B2 | 6/2013 | Kazmi et al. |
| 2016/0119970 A1 | 4/2016 | Lee et al. |

(Continued)

FOREIGN PATENT DOCUMENTS

| EP | 2621242 A1 | 7/2013 |
| EP | 4050932 A1 | 8/2022 |

(Continued)

OTHER PUBLICATIONS

3rd Generation Partnership Project (3GPP); "Beam Failure Detection in DRX", R2-1813886, Huawei, HiSilicon; 3GPP TSG-RAN WG2#103bis, Oct. 8-12, 2018, Chengdu, China, 3 pages.

(Continued)

Primary Examiner — Faruk Hamza
Assistant Examiner — Cassandra L Decker
(74) Attorney, Agent, or Firm — Flaster Greenberg, P.C.

(57) ABSTRACT

Power efficient measurements may be implemented for high frequency operations. A WTRU may determine measurement occasions, DRX cycle/configuration transitions, DRX pause/resume, DRX timer operation, and/or BFR based on scheduling activity, beam configuration, BFI detection, BFD, beam loss, etc. A WTRU may be configured with multiple DRX cycles and measurement opportunities (e.g., with different periodicities). The WTRU may perform (e.g., RS) measurement(s) with determined/configured timing (e.g., DRX on-durations) in a first DRX cycle based on condition(s). The WTRU may switch to a second DRX cycle and perform RS measurement(s) with determined/configured timing based on condition(s) (e.g., counted number of BFIs detected in first DRX cycle). The WTRU may switch from the second (e.g., short) DRX cycle to the first (e.g., long) DRX cycle or to non-DRX operation (e.g., DRX suspension or reset DRX inactivity timer) based on condi- (Continued)

tion(s) (e.g., number of BFIs in first and/or second DRX cycle(s)).

20 Claims, 5 Drawing Sheets

Related U.S. Application Data

No. 17/795,332, filed as application No. PCT/US2021/017756 on Feb. 12, 2021.

(60) Provisional application No. 62/975,416, filed on Feb. 12, 2020.

(56) References Cited

U.S. PATENT DOCUMENTS

| | | | |
|---|---|---|---|
| 2016/0381610 A1* | 12/2016 | Pu | H04W 36/0058 |
| | | | 455/436 |
| 2017/0347361 A1 | 11/2017 | Tsuboi et al. | |
| 2019/0036590 A1* | 1/2019 | Nagaraja | H04B 7/088 |
| 2019/0053087 A1 | 2/2019 | Callender et al. | |
| 2019/0254110 A1 | 8/2019 | He et al. | |
| 2019/0261287 A1 | 8/2019 | Yugeswar | |
| 2019/0349120 A1 | 11/2019 | Cheng et al. | |
| 2019/0394082 A1 | 12/2019 | Cirik | |
| 2020/0053824 A1 | 2/2020 | He | |
| 2020/0092073 A1 | 3/2020 | Papasakellariou et al. | |
| 2020/0413469 A1 | 12/2020 | Wu et al. | |
| 2021/0006456 A1 | 1/2021 | Kim et al. | |
| 2021/0021329 A1* | 1/2021 | Zhang | H04W 16/28 |
| 2021/0144742 A1 | 5/2021 | Jeon et al. | |
| 2021/0167874 A1 | 6/2021 | Jiang | |
| 2022/0116802 A1 | 4/2022 | Kim | |
| 2022/0131596 A1* | 4/2022 | Sharma | H04B 7/0888 |
| 2022/0159484 A1* | 5/2022 | Matsumura | H04B 7/0695 |
| 2022/0166581 A1 | 5/2022 | Zhang et al. | |
| 2022/0209920 A1 | 6/2022 | Wu et al. | |
| 2022/0217565 A1 | 7/2022 | Thangarasa et al. | |
| 2022/0217734 A1 | 7/2022 | Chen | |
| 2022/0225147 A1 | 7/2022 | Chen | |
| 2024/0251452 A1 | 7/2024 | Agiwal et al. | |

FOREIGN PATENT DOCUMENTS

| | | |
|---|---|---|
| JP | 2012531088 A | 12/2012 |
| WO | 2016111219 A1 | 7/2016 |
| WO | 2017138869 A1 | 8/2017 |
| WO | 2018232090 A1 | 12/2018 |
| WO | 2020020495 A1 | 1/2020 |

OTHER PUBLICATIONS

3rd Generation Partnership Project (3GPP); "BFR Procedure during DRX Mode", R2-1815238, ASUSTeK, 3GPP TSG-RAN WG2 Meeting #103-bis, Oct. 8-12, 2018, Chengdu, China, 5 pages.

3rd Generation Partnership Project (3GPP); "CR on TS38.133 for Beam Failure Detection Requirements", R4-1804791, Huawei, HiSilicon, 3GPP TSG-RAN WG4 Meeting #86bis, Apr. 16-20, 2018, Melbourne, Australia, 3 pages.

3rd Generation Partnership Project (3GPP); "New SID: Study on Supporting NR from 52.6GHz to 71 GHz", RP-193259 (revision of RP-193258), Intel Corporation, 3GPP TSG RAN Meeting #86, Dec. 9-12, 2019, Sitges, Spain, 3 pages.

3rd Generation Partnership Project (3GPP); "Medium Access Control (MAC) Protocol Specification", 3GPP TS 38.321 V15.8.0 (Dec. 2019), Valbonne, France, 78 pages.

3rd Generation Partnership Project (3GPP); "NR; NR and NG-RAN Overall Description", Stage 2, 3GPP TS 38.300 V16.0.0 (Dec. 2019), Valbonne, France, 101 pages.

3rd Generation Partnership Project (3GPP); "Physical layer procedures for control", 3GPP TS 38.213 V16.0.0 (Dec. 2019), Valbonne, France, 146 pages.

3rd Generation Partnership Project (3GPP); "Radio Resource Control (RRC) protocol specification", 3GPP TS 38.331 V15.8.0 (Dec. 2019), Valbonne, France, 532 pages.

Third Generation Partnership Project (3GPP), "UE Power Consumption Reduction in RRM Measurements", Nokia, Nokia Shanghai Bell 3GPP TSG RAN WG1 Ad-Hoc Meeting 1901, R1-1901190, Taipei, Taiwan, Jan. 21-25, 2019, 11 pages.

Third Generation Partnership Project (3GPP), "Power consumption reduction in RRM measurements", Nokia, Nokia Shanghai Bell 3GPP TSG-RAN WG2 Meeting #106, R2-1906697, Reno, USA, May 13 -17, 2019, 6 pages.

* cited by examiner

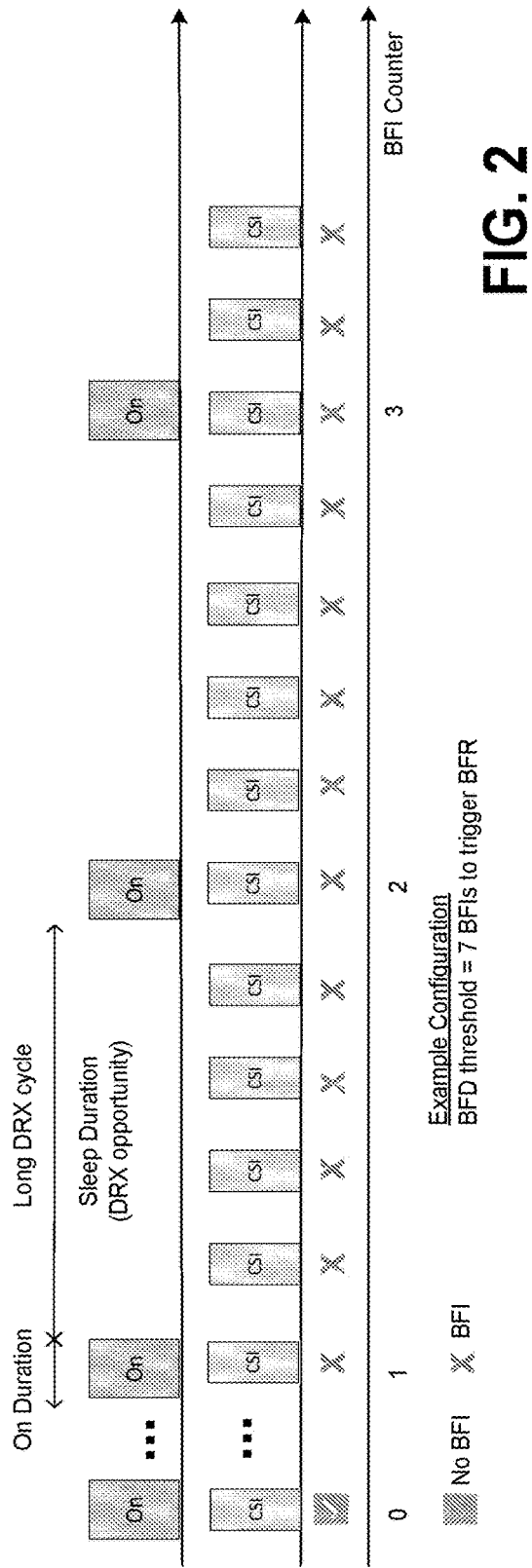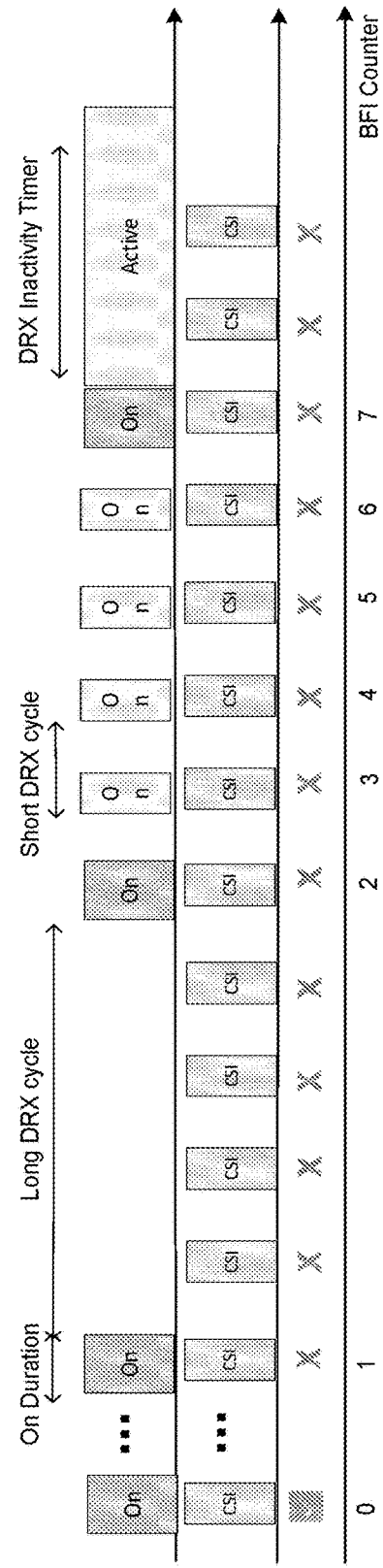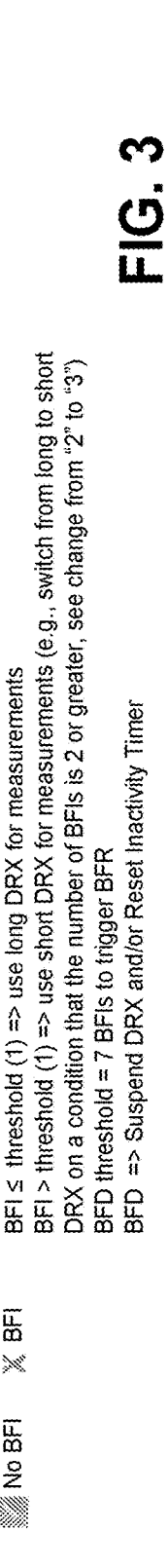

POWER EFFICIENT MEASUREMENTS AT HIGHER FREQUENCIES

CROSS-REFERENCE TO RELATED APPLICATIONS

This application is a continuation of U.S. Non-Provisional application Ser. No. 18/642,172, filed Apr. 22, 2024, which is a continuation of U.S. Non-Provisional application Ser. No. 17/795,332, filed Jul. 26, 2022, which is the 371 National Stage of International Application No. PCT/US2021/017756, filed Feb. 12, 2021, which claims the benefit of Provisional U.S. Patent Application No. 62/975,416, filed Feb. 12, 2020, the disclosure of which is incorporated herein by reference in its entirety.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Power efficient measurements may be implemented for high frequency operations. A wireless transmit/receive unit (WTRU) may determine measurement occasions as a function of scheduling activity and beam configuration. A WTRU may determine measurement occasions for beam failure detection (BFD), radio link monitoring (RLM), and/or mobility as a function of discontinuous reception (DRX) and/or BFD configuration. A WTRU may determine that a first set of reference signal (RS) measurement opportunities are applicable based on a first condition (e.g., if/when a DRX/BFD/channel state information (CSI) condition is met) and a second set of RS measurement opportunities are applicable based on a second condition (e.g., if/when the DRX/BFD/CSI condition is not met). A WTRU may be configured with multiple sets of CSI-RS measurement opportunities (e.g., with different periodicities). A WTRU may assume a given set is applicable, for example, if a DRX/BFD/CSI condition is met. A WTRU may determine DRX operation or non-DRX operation, for example, based on whether a BFI counter is or is not less than a threshold. A WTRU may reset an inactivity timer, for example, based on one or more BFD statuses (e.g., beam failure instance (BFI) counter >threshold and no BFD resource before inactivity timer expiry). A WTRU may pause, disable, or (re)-start the BFD timer, for example, upon going into inactive time. A WTRU may change beam states, (de)-activate associated CSI-RS, and/or pause/resume associated BFD, for example, as a function of the DRX state/configuration or related signaling. A WTRU may transition to a different DRX cycle/configuration, pause/resume DRX functionality, and/or (re)-start/stop one or more DRX timers, for example, as a function of detecting a beam failure, loss of beam(s), or related measurements. A WTRU may trigger a BFR/beam reestablishment procedure (e.g., a new BFR/beam reestablishment procedure), for example, if the WTRU does not have a satisfactory beam during a DRX-beam observation period.

In examples, methods may be implemented for power efficient measurements for high frequency operations. Methods may be implemented (e.g., in whole or in part), for example, by device(s) (e.g., a WTRU, a network node such as a gNodeB (gNB), and/or the like) and/or system(s) that are configured to implement the methods, e.g., having one or more processors configured to execute the methods (e.g., in whole or in part) as computer executable instructions that may be stored on a computer readable medium or a computer program product. The computer readable medium or the computer program product may comprise instructions that cause one or more processors to perform the methods by executing the instructions.

A WTRU may perform beam failure detection (BFD) and recovery associated with DRX. In examples, a WTRU may be configured to perform one or more of the following: perform a first CSI-RS measurement during an on-duration associated with a first DRX cycle; determine a first number of beam failure instances based on the first CSI-RS measurement; switch to a second DRX cycle based on the determined first number of beam failure instances; perform a second CSI-RS measurement during an on-duration associated with the second DRX cycle; determine a second number of beam failure instances based on the second CSI-RS measurement; and, on a condition that the second number of beam failure instances is greater than a first threshold, switch to a non-DRX operation. For example, see FIG. 3 herein. The non-DRX operation may include at least one of a suspension of DRX or a reset of an inactivity timer. A beam failure instance may be associated with a channel condition state determination. A timing associated with at least one of the first CSI-RS measurement or the second CSI-RS measurement may be indicated to the WTRU by a network device. The first DRX cycle may be a long DRX cycle and the second DRX cycle may be a short DRX cycle.

The WTRU may be (e.g., further) configured to switch from the second DRX cycle to the first DRX cycle, for example, on a condition that the second number of beam failure instances is less than a second threshold.

The WTRU may be (e.g., further) configured to receive configuration information that indicates the first DRX cycle and the second DRX cycle.

The WTRU may be (e.g., further) configured to determine a timing associated with at least one of the first CSI-RS measurement or the second CSI-RS measurement.

At least one of the first number of beam failure instances or the second number of beam failure instances may be determined via use of a beam failure instance counter.

BRIEF DESCRIPTION OF THE DRAWINGS

FIG. 2 illustrates an example of detection of beam failure instances with measurement opportunities during on durations in a DRX cycle.

FIG. 3 illustrates an example of detecting beam failure instances at measurement opportunities with different periodicities during DRX on durations in multiple DRX cycles with different durations.

EXAMPLE NETWORKS FOR IMPLEMENTATION OF THE EMBODIMENTS

Power efficient measurements may be implemented for high frequency operations. A wireless transmit/receive unit (WTRU) may determine measurement occasions as a function of scheduling activity and beam configuration. A WTRU may determine measurement occasions for beam failure detection (BFD), radio link monitoring (RLM), and/or mobility as a function of discontinuous reception (DRX) and/or BFD configuration. A WTRU may determine that a first set of reference signal (RS) measurement opportunities are applicable based on a first condition (e.g., if/when a DRX/BFD/channel state information (CSI) condition is met) and a second set of RS measurement opportunities are applicable based on a second condition (e.g., if/when the DRX/BFD/CSI condition is not met). A WTRU may be configured with multiple sets of CSI-RS measurement opportunities (e.g., with different periodicities). A WTRU may assume a given set is applicable, for example, if a DRX/BFD/CSI condition is met. A WTRU may determine DRX operation or non-DRX operation, for example, based on whether a BFI counter is or is not less than a threshold. A WTRU may reset an inactivity timer, for example, based on one or more BFD statuses (e.g., beam failure instance (BFI) counter >threshold and no BFD resource before inactivity timer expiry). A WTRU may pause, disable, or (re)-start the BFD timer, for example, upon going into inactive time. A WTRU may change beam states, (de)-activate associated CSI-RS, and/or pause/resume associated BFD, for example, as a function of the DRX state/configuration or related signaling. A WTRU may transition to a different DRX cycle/configuration, pause/resume DRX functionality, and/or (re)-start/stop one or more DRX timers, for example, as a function of detecting a beam failure, loss of beam(s), or related measurements. A WTRU may trigger a BFR/beam reestablishment procedure (e.g., a new BFR/beam reestablishment procedure), for example, if the WTRU does not have a satisfactory beam during a DRX-beam observation period.

Figure 1A:
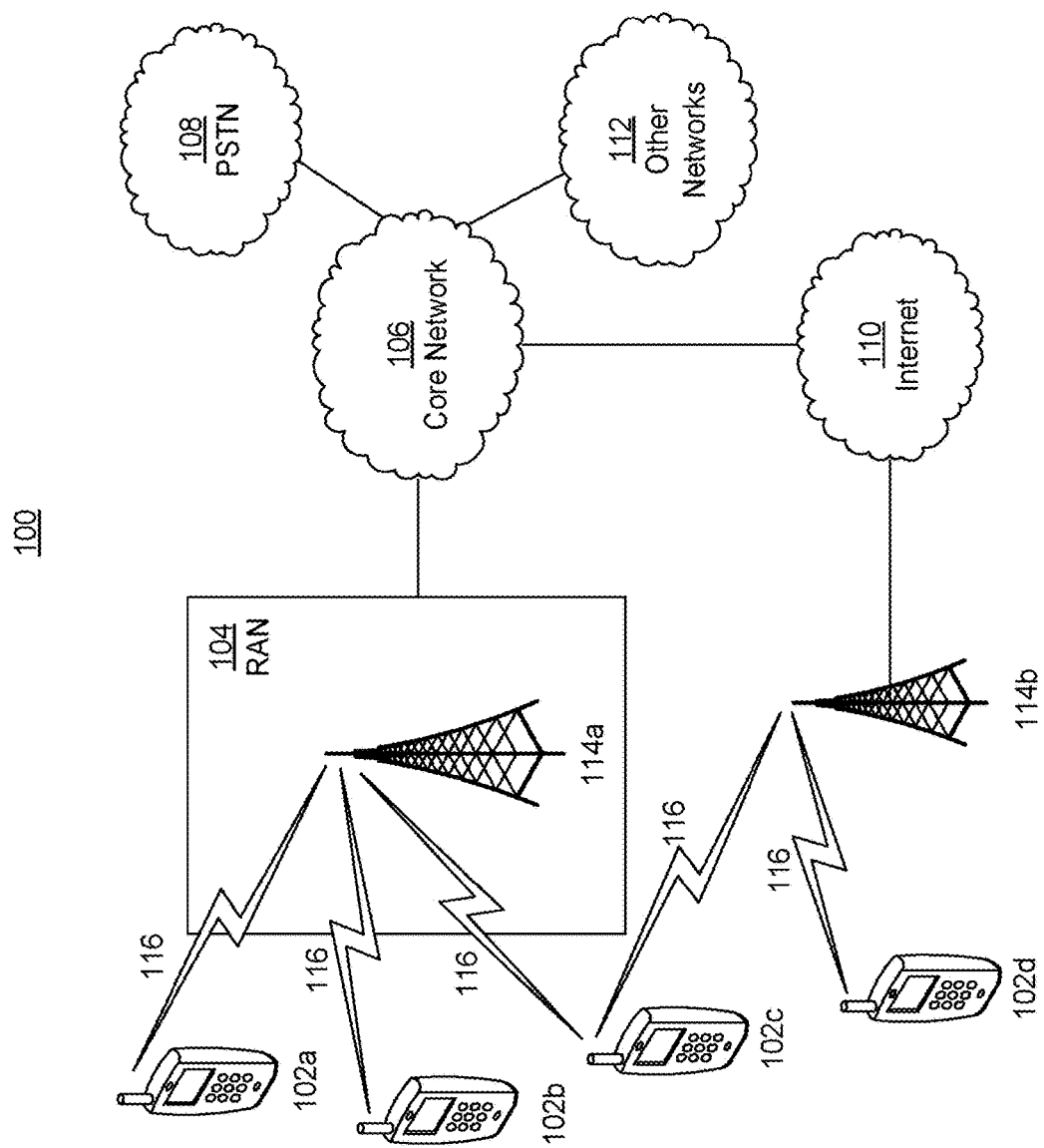
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
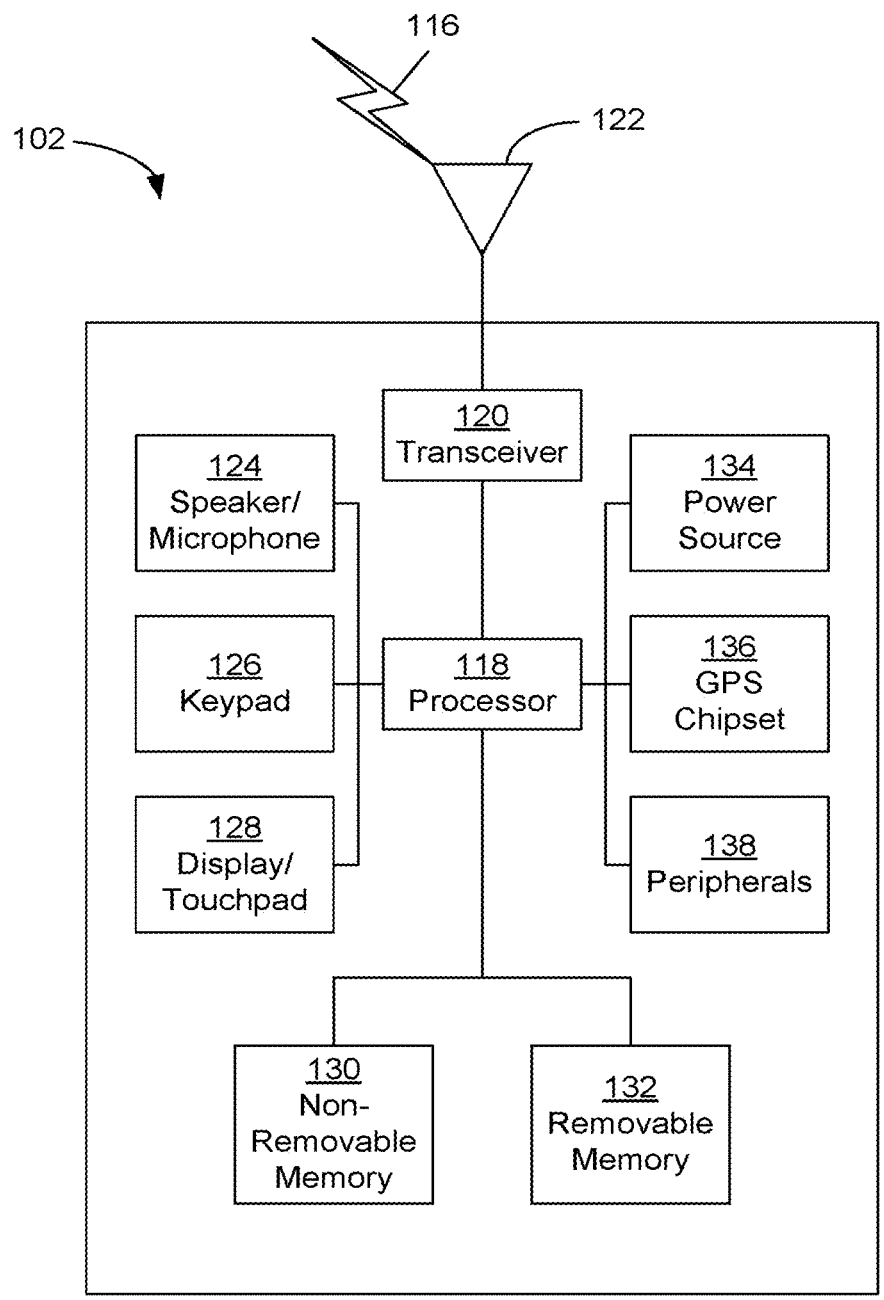
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
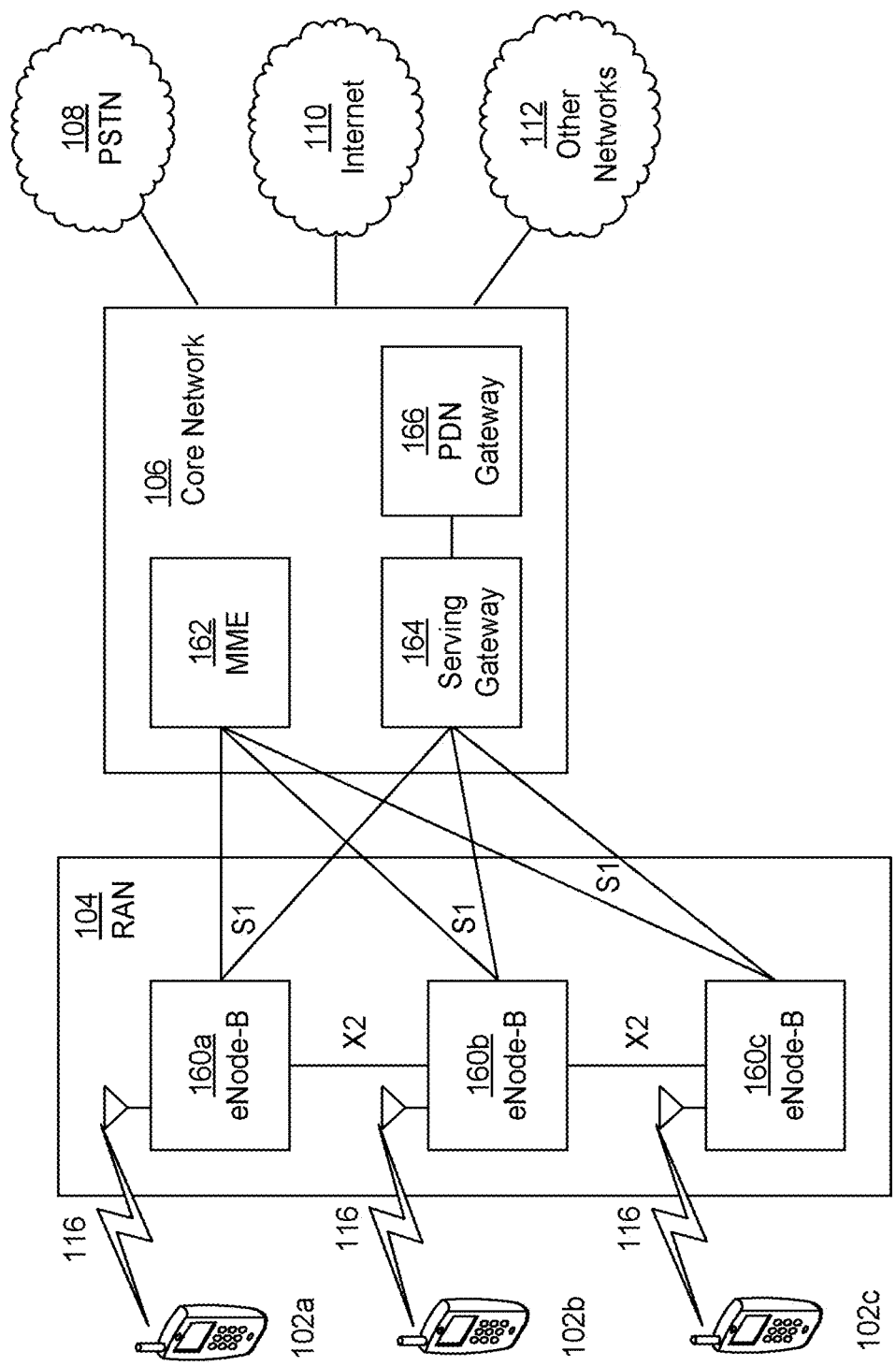
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHz, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
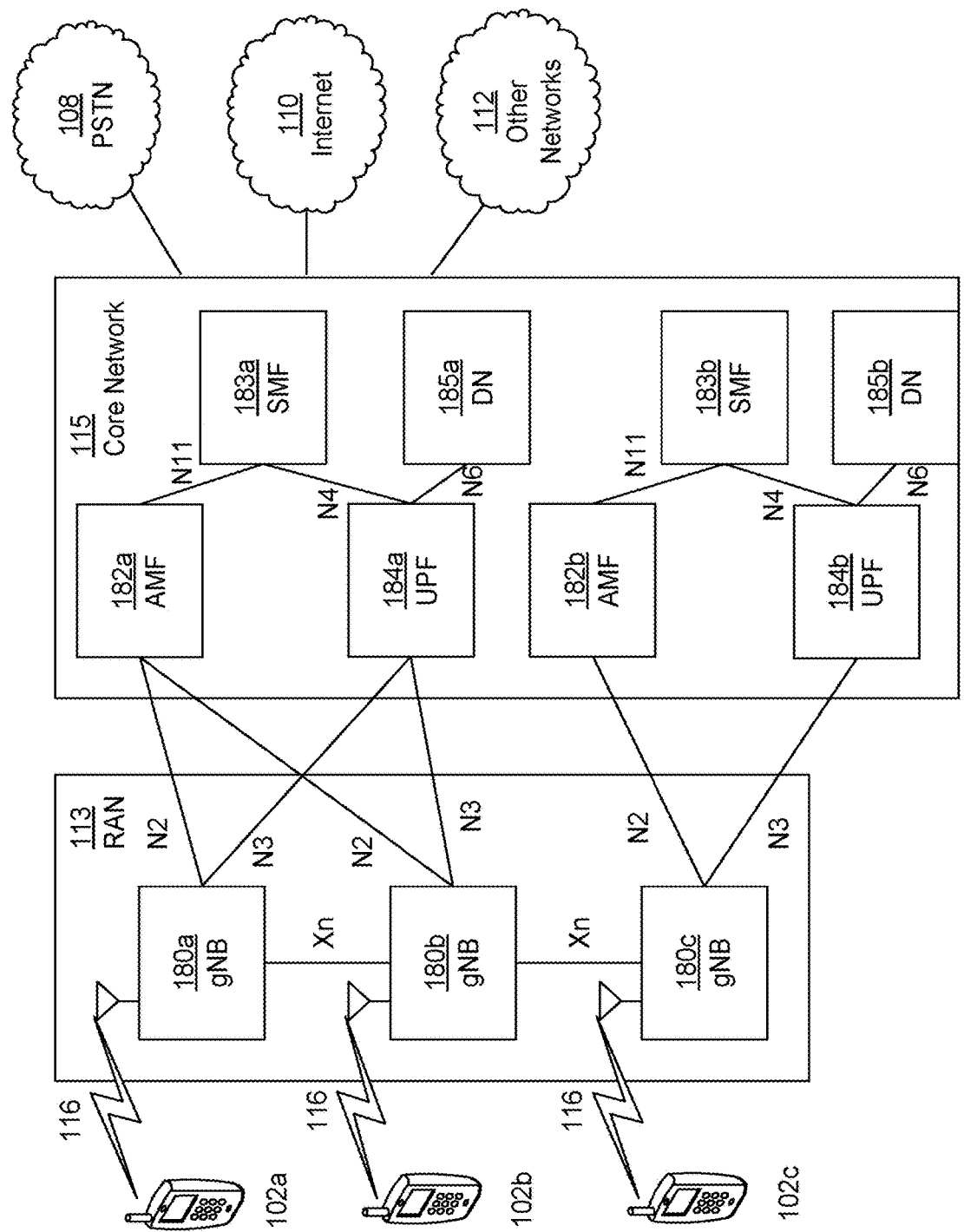
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Wireless technologies, e.g., using New Radio (NR) as an example herein, may support higher frequencies and beamforming (e.g., for frequencies from 52.6 GHz to 71 GHZ). NR may be used for high data rate eMBB, mobile data offloading, short range high data rate D2D communication and industrial IoT. Power consumption of WTRUs may be improved. For example, a WTRU's radio may be turned off to save energy without impairing the WTRU's beam management, mobility and connectivity management.

Beam failure detection (BFD) and beam failure recovery (BFR) may be provided. A WTRU may be configured (e.g. in a beamformed NR system) to maintain one or multiple beam pairs. A WTRU may monitor one or more periodic channel state information reference signals (CSI-RS) on a serving downlink (DL) beam, for example, to assess beam quality and compute a corresponding quality metric. A WTRU's physical layer (PHY) entity may report a beam failure instance (BFI) to the MAC sub-layer, for example, if the beam quality in a given RS period for (e.g. some and/or all) beams in the maintenance set is below a configured threshold.

Lost beam pair(s) may be re-established faster than a radio link monitoring (RLM)/radio link failure (RLF) procedure. A WTRU may maintain a beam failure detection (BFD) procedure in which maintained beams are periodically measured. A beam failure recovery (BFR) request may be reported to the network, for example, upon detecting a beam failure. BFR may be configured for beam maintenance on the primary cell (Pcell) and/or secondary cell (Scell). BFD measurements may be taken, for example, at the max of {DRX period, CSI-RS period}, (e.g. in legacy systems), for example, if BFD and discontinuous reception (DRX) are configured.

The MAC entity may maintain a beam failure instance (BFI) counter (BFI_counter) for beam failure detection (BFD). The MAC entity may count the number of BFI indications received from the PHY entity. A BFR request may be triggered (e.g. to notify the serving gNB that a beam failure has been detected), for example, if a BFI counter exceeds a threshold or maximum number of BFIs.

The MAC entity may reset the BFI counter, for example, (e.g. only) after a beam failure detection timer (BFD_timer) has expired, which may help provide hysteresis in the detection function. A WTRU may reset the BFD timer, for example, each time a BFI is indicated. In examples, the MAC entity may (e.g. only) reset the BFI counter, for example, after observing no BFI indications from a physical layer (PHY) for multiple (e.g. three) consecutive CSI-RS periods (e.g. based on the BFD timer configuration).

A WTRU may report a BFR request for a beam failure detected for the SpCell, for example, by initiating a random access procedure for beam re-establishment. The WTRU may select an appropriate physical random access channel (PRACH) preamble and/or PRACH resource dependent on the best and/or better measured downlink beam (CSI-RS or DL synchronization signal block (SSB)). The WTRU may reestablish a beam pair, for example, if the WTRU can determine an association between DL beams and UL preambles and/or PRACH occasions. The downlink (DL) beam selected by the WTRU may be tested, for example, by receiving the random access response (RAR) on the DL beam. A reestablishment random access (RA) procedure may be made faster, for example, if the gNB configures a set of contention-free PRACH preambles/resources, which may be prioritized for selection by the WTRU (e.g. upon initiating the RA procedure). A WTRU may report a BFR request for a beam failure detected for the Scell, for example, by transmitting a MAC CE indicating the cell on which beam failure was detected.

DRX may refer to any form of power saving applied by the WTRU characterized by reduced reception and/or transmission activity. DRX may be applicable to any WTRU state (e.g., connected, inactive, idle state, etc.). Connected mode DRX may specify a (e.g., minimum) physical downlink control channel (PDCCH) decoding requirement, e.g., while the WTRU is configured with connected mode DRX. The WTRU may be (e.g. further) configured to monitor the PDCCH during the on duration, for example, if the WTRU receives a wake-ups signal (WUS) prior to the on duration. DRX may define the active time for decoding (e.g., some) downlink control information (DCI)(s). DRX may be based on (e.g., fixed periodic) "on" durations that occur in a DRX cycle (e.g., once per DRX cycle). On durations may be specified.

Channel state information (CSI) may include, for example, at least one of the following: channel quality index (CQI), rank indicator (RI), precoding matrix index (PMI), an L1 channel measurement (e.g., reference signal received power (RSRP) such as L1-RSRP, or signal to interference and noise ratio (SINR)), CSI-RS resource indicator (CRI), synchronization signal (SS)/physical broadcast channel (PBCH) block resource indicator (SSBRI), layer indicator (LI), and/or any other measurement quantity measured by the WTRU from the configured CSI-RS or SS/PBCH block.

Uplink control information (UCI) may include, for example, CSI, hybrid automatic repeat request (HARQ) feedback for one or more HARQ processes, Scheduling request (SR), Link recovery request (LRR), cell group uplink control information (CG-UCI) and/or other control information bits that may be transmitted on the physical uplink control channel (PUCCH) or physical uplink shared channel (PUSCH).

Channel conditions may include any conditions relating to the state of the radio/channel. A WTRU may determine channel conditions from, for example, a WTRU measurement (e.g., L1/SINR/RSRP, CQI/modulation and coding scheme (MCS), channel occupancy (CO), received signal strength indicator (RSSI), power headroom, exposure headroom), L3/mobility-based measurements (e.g., RSRP, reference signal received quality (RSRQ)), an RLM state, and/or channel availability in unlicensed spectrum (e.g., whether the channel is occupied based on determination of an listen-before-talk (LBT) procedure or whether the channel is deemed to have experienced a consistent LBT failure).

Wireless transmissions (e.g., in NR systems) may support operation in higher frequency bands. Transmissions on high frequency bands may experience a higher path loss, e.g., due to channel characteristics of those bands. Beam-based transmission may be beneficial in higher frequencies (e.g., to direct the power on one or more beams).

Omni-directional transmissions may be used in higher frequency ranges, for example, to target short range transmissions, lower data rates or control information, and/or for WTRUs without established narrow beams. For example, broadcast transmissions (e.g., for sidelink) may be used for short range communications.

Omni-directional link management may have different measurement requirements than directional beams, for example, for beam management, radio link monitoring, CSI reporting, and/or mobility management purposes. Measurement requirements may be adapted, for example, to mitigate the impact on battery usage of a WTRU may be useful (e.g. combined with beam management and higher frequencies).

Beam management processes may not function properly (e.g., in the absence of requirements for beam maintenance measurement during DRX sleep periods), for example, if/when a WTRU wakes up after a long DRX period (e.g., especially if a DRX period is relatively longer than CSI-RS periodicity). Radio link monitoring based on CSI-RS overlapping with DRX on durations may result in increased power consumption (e.g., if/when the DRX period is reduced to ensure the radio link is maintained) or higher probability of link loss (e.g., if/when the DRX period is too large for the WTRU to maintain beams without waking up), which may present a tradeoff between power consumption and the level of radio link maintenance.

Beam management may be provided. Beams (e.g. at higher frequencies) may be characterized, for example, based on beam identities and/or management processes.

A beam may be associated with a beam identity (beam ID) or a beam index. A beam index may be unique to downlink (DL) and/or uplink (UL). For example, a downlink beam may identify a downlink beam and an associated uplink beam. The association between uplink and downlink beams may be configured and/or implicitly determined, for example, based on the outcome of a beam management process and the associated UL and DL frequencies.

A WTRU may maintain a beam management process, for example, to determine which beam IDs to maintain, activate, deactivate, and/or consider as a candidate for activation, among other actions. A beam management process may keep track of a list of maintained beams and a list of candidate beams. A beam management process may (e.g., further) carry actions related to BFD and BFR. A beam management process may (e.g., also) be used to change beam states. A (e.g., each) beam may have, for example, at least one of the following states: (i) active and/or maintained; (ii) de-active; (iii) candidate; (iv) initial state; and/or (v) adjusted state.

A WTRU may measure associated CSI-RS or SSBs (e.g., part of BFD), for example, for a beam in an active and/or a maintained state. The WTRU may monitor associated PDCCH resources or search spaces. The WTRU may activate a beam (e.g., after reception of activation signaling), for example, by semi-static configuration (e.g., a default active beam), or after measuring a channel state quantity for an associated measurement resource below a configured threshold.

A WTRU may not measure associated CSI-RS or SSBs (e.g., part of BFD), for example, for a beam in a de-active state. The WTRU may de-activate a beam, for example, after reception of de-activation signaling, after declaring a beam failure, and/or after measuring a channel state quantity for an associated measurement resource below a configured threshold.

A beam in a candidate state may (e.g. also) be a de-active beam. A beam ID may be a candidate, for example, if configured by higher layer signaling or determined by the WTRU (e.g., based on channel condition measurements on associated CSI-RS/SSBs). A WTRU may measure associated CSI-RS or SSBs, for example, as part of BFR for a candidate beam (e.g., for beam reselection).

A beam in an initial state may be transmitted/received with default parameters (e.g., beamwidth, etc.).

A beam in an adjusted state may be transmitted/received with modified parameters.

Beam configuration and characteristics may be provided. Beam shaping and/or patterns may be provided.

A beam may be characterized, for example, by at least one of the following: (i) beam parameters; (ii) beam width or directivity index; (iii) beam type; (iv) beam reference signal; and/or (v) beam transmission configuration indicator (TCI) state(s).

A beam may be characterized by beam parameters. Beam parameters may include one or more of the following: applied (e.g., spatial) filter, codebook(s), precoding table(s) and/or weight(s), RF phase shift(s), channel state information (CSI). Beam parameters may exist for a downlink beam, an uplink beam, or a bidirectional beam. A channel may be reciprocal (e.g., time division duplex (TDD) or not reciprocal (e.g., frequency division duplex (FDD)), etc. A WTRU may be configured with a plurality of beams, for example, where each of multiple beams may be associated with a different set of parameter(s) (e.g., each with an assigned value or value range). For example, a WTRU may be configured with a plurality of beams, where each beam may be associated with a specific (e.g., different) spatial filter.

A beam may be characterized by beam width and/or a beam directivity index. For example, a WTRU may be configured to associate a beam with a "width." A beam width may correspond to a set of beam parameter(s). For example, a beam width may correspond to one or more weighting patterns. A beam width may correspond to a specific spatial filter.

A beam may be characterized by a beam type. For example, a beam may be omnidirectional or directional, which may be considered a special case of beam width characterization.

A beam may be characterized by a beam reference signal. For example, a beam may be associated with a synchronization signal block (SSB), and/or a channel state information reference signal (CSI-RS), for example, for the purpose of measuring the quality of the DL beam, beam failure detection, and/or identifying a beam.

A beam may be characterized by beam transmission configuration indicator (TCI) state(s). A beam may be associated with one or more TCI states. A network may use a TCI, for example, to indicate the (de)-activation status of a given beam for PDCCH and/or physical downlink shared channel (PDSCH) transmission. A beam may (e.g. also) be associated with an uplink TCI state.

There may be beam related requirements for higher frequencies. For example, a WTRU implementation may meet requirements for one or more (e.g. foregoing) beam characteristics, which may be a testing aspect of the WTRU implementation. In examples, testing may include an expected pattern of radiation, spectral leakage of the radiation pattern, etc. Different WTRU implementations may conform, for example, to specific (e.g., determined, selected, configured) sensitivity levels, spectral emission patterns, etc. WTRU conformity may support different beams meeting specific requirements.

A WTRU may have capabilities for beam-related requirements for higher frequencies. For example, a WTRU implementation may support one or more requirements to make available different beams with different interference characteristics and/or beam widths. A WTRU may report beam availability to the network, for example, as part of a WTRU capability exchange.

A WTRU may be configured for beam-related requirements for higher frequencies. A WTRU may be configured with a plurality of beams. For example, a WTRU may be configured with beam ID=0 (e.g., for an omnidirectional beam) and with beam ID !=0 (e.g., for directional beams). A WTRU may be (e.g., further) configured with one or more directional beams. For example, a WTRU may be configured with beam ID=1 (e.g., associated with a first beam width x=1), beam ID=2 (e.g., associated with a second beam width x=2), and so on (e.g., up to a maximum number of beams). In examples, the maximum number of directional beams may be a WTRU capability.

A WTRU may be configured for beam width control. A WTRU may be configured with a reference signal (e.g., SSB, CSI-RS) configuration for a given beam. A WTRU may be configured, for example, such that a (e.g., one) reference signal configuration may be assigned a plurality of beam widths. A beam reference signal configuration may be associated with a plurality of beam width indices, e.g., where a (e.g., each) index may correspond to (e.g., at most) one beam width. A beam (e.g. in such a scenario) may be defined, for example, based on the beam's reference signal configuration, e.g., where control thereof may be associated with changes in the beam width index. A beam width index may correspond to, for example, a beam ID.

Beam control may be provided (e.g. in downlink control information (DCI). A WTRU may receive control signaling (e.g., on a first beam carrying the control channels, such as PDCCH). Control signaling may include an index to a beam configuration for: (i) the reception of data (e.g., for a DL beam on a data channel such as PDSCH), (ii) the transmission of data (e.g., for a bi-directional beam on an uplink channel, such as PUSCH), (iii) and/or the transmission of control information (e.g., for a bi-directional beam on an uplink control channel, such as PUCCH) using the indicated beam configuration.

A WTRU may receive control signaling that indicates (de)-activation of a beam configuration, beam index, and/or associated beamwidth(s). A (de)-activation indication may be applicable to a specific direction (e.g., downlink), a specific channel (e.g., PDSCH, PDCCH, PUSCH, PUCCH, PRACH), and/or for a subset of transmission types (e.g., paging, UCI type, data type). Control signaling may be dynamic (e.g., received on a MAC CE or DCI) or semi-static (e.g., received by RRC (re)-configuration).

Beam reference signals may be WTRU-specific. A WTRU may be configured with WTRU-specific reference signals (e.g., SSB, CSI-RS) for one or more beams of the WTRU's configuration, for example, in addition to any common beam configurations (e.g., SSBs) determined from broadcast signals and/or configurations. A WTRU may receive a configuration, for example, using L3/RRC signaling.

A reference signal (RS) configuration may be a function of a beam index. For example, a WTRU may be configured with one or more indices (e.g. representing a beam and/or a beam width) that may (e.g. each) be associated with a reference signal configuration. A WTRU may determine the applicable resource allocation (e.g., in time and/or frequency) for a given index using the associated configuration. The gNB may control the allocation of the resources for reference signals for beam management and/or the determination of the beam parameters (e.g., the applicable beam width for uplink transmissions for a bi-directional beam), for example, by controlling the beam index (e.g., using an indication in a DCI on a control channel). The WTRU may (e.g. be expected to) perform RS-related measurements in the resources.

A beam index may be a function of an RS configuration (e.g. blind detection and/or measurement). For example, a WTRU may perform measurement using a plurality of reference signal configurations. A WTRU may perform measurement in the time/frequency resources associated with different reference signal configurations. A WTRU may determine an index from an association with a reference signal configuration, for example, if the WTRU determines that a measurement on a corresponding resource is above a threshold. The WTRU may select an index applicable for subsequent transmission and determine the applicable beam parameters according to the index, e.g., the beam width. The gNB may control the allocation of beams and/or the determination of beam parameters (e.g., the applicable beam width for uplink transmissions for a bi-directional beam), for example, by controlling the transmission of WTRU-specific reference signals for beam management.

Measurements may be a function of Discontinuous Reception (DRX). A network (NW) may configure a WTRU, for example, so that measurement opportunities for beam management (e.g., for BFD) are aligned (e.g., as aligned as possible) with the WTRU's power savings mechanisms (e.g., if configured).

A network configuration may provide alignment between DRX and BFD. For example, a WTRU may receive a DRX configuration that causes measurement opportunities for beam management (e.g., for BFD) to (e.g. largely) coincide or align in time with the WTRU's resulting DRX active time. Alignment of the opportunities may coincide with the DRX on-duration part of the DRX active time.

A network configuration may provide a WTRU-configurable masking function between DRX and BFD. A WTRU may be configured, for example, to perform beam-related measurements when in DRX active time (e.g., a masking function between DRX active time and measurement opportunities). A WTRU may determine to apply masking (e.g. only) based on the DRX on-duration period (e.g., the WTRU may not perform beam-related measurement outside the WTRU's DRX on-duration period). A masking function may be, for example, an L3/RRC configurable aspect of the WTRU.

A network configuration may provide a WTRU-configurable RS for beam management and DRX alignment. A WTRU may be configured with WTRU-specific reference signals for beam management (e.g., SSB, CSI-RS). A WTRU may receive a configuration, for example, where the periodicities of the RS and DRX cycles are similar and/or an integer multiple of each other.

A network configuration may provide a WTRU-configurable RS for beam management and DRX control. A WTRU may determine measurement opportunities for beam management, for example, as a function of DRX PDCCH monitoring occasions. The network may control DRX. PDCCH blind decoding occasions may be synchronized between the WTRU and the NW. A WTRU may be configured with one or more measurement configurations to measure channel conditions (e.g., based on CSI-RS and/or SSBs), such as a set of RS measurement opportunities. A WTRU may be configured to determine measurement opportunities and/or timing of the measurement opportunities (e.g., for beam management), for example, according to at least one of the following: (i) DRX on-duration; (ii) DRX inactivity timer; (iii) DRX cycle duration (e.g., short, long); (iv) DRX configuration; (v) DRX active time; (vi) wake up signal (WUS) occasions; (vii) wake up signal (WUS); (viii) channel conditions (e.g., RSRP, SINR, RSSI, power headroom, CO and/or CQI); (ix) speed or level of channel variation (e.g., in terms of fast fading); (x) status of beams in the maintained set of beams; (xi) downlink reception; (xii) uplink transmission; (xiii) change of bandwidth part (BWP); and/or (xiv) change of search space sets (e.g. from reception of DCI format 2_0).

A WTRU may be configured to determine measurement opportunities and/or timing of the measurement opportunities, for example, based on DRX on-duration. A WTRU may determine that a first set of RS measurement opportunities may be applicable during the on-duration period. The WTRU may determine the pattern in time (e.g., and/or in frequency) of RS measurement occasions relative to the start (e.g., the first symbol) of the on-duration period. A pattern may be a configurable aspect of the WTRU. A pattern may be a WTRU-specific pattern and/or an indication to apply a masking function, for example, to a system-specific set of RS occasions. A WTRU may (e.g. similarly) determine that a second set of RS measurements is applicable outside the On-Duration period, for example, (e.g., only) if (i) the WTRU is in DRX active time and/or (ii) the WTRU is configured to apply a masking function.

FIG. 2 illustrates an example of beam management detection of beam failure instances with measurement opportunities during on durations associated with a DRX cycle. As shown by example in FIG. 2, the DRX cycle may be a long DRX cycle. A WTRU may be configured to detect beam failure (e.g., BFD) based on detection of a threshold number of BFIs. BFIs are indicated with an X and the lack of a BFI is indicated by a checkmark in FIG. 2. BFIs may be tracked or counted, for example, using a BFI counter (e.g., as shown in FIG. 2). A WTRU may be configured to detect or trigger beam failure (e.g., BFD), for example, based on a threshold of greater than six (6) BFIs or equal to seven (7) BFIs (e.g., as shown by example in FIG. 2). Measurement opportunities to detect BFIs, or lack thereof, may occur during on durations in a long DRX cycle. The count of BFIs (e.g., by a BFI counter) detected during on durations of long DRX cycles is shown as 0, 1, 2, and 3 in FIG. 2. BFIs that occur outside of an on duration may not be detected or counted by the BFI counter. It may take a long time to count seven (7) BFIs during on durations as shown to detect beam failure.

A WTRU may be configured to determine measurement opportunities and/or timing of the measurement opportunities, for example, based on a DRX inactivity timer. The WTRU may determine that a first set of RS measurement opportunities may be applicable, for example, if the DRX inactivity timer is running, and a second set of RS measurement opportunities may be applicable, for example, otherwise.

A WTRU may be configured to determine measurement opportunities and/or timing of the measurement opportunities, for example, based on DRX cycle duration (e.g., short, long). The WTRU may determine that a first set of RS measurement opportunities may be applicable, for example, if the DRX short cycle is used, and a second set of RS measurement opportunities may be applicable otherwise (e.g., if the long cycle is used).

A WTRU may be configured to determine measurement opportunities and/or timing of the measurement opportunities, for example, based on a DRX Configuration: The WTRU may determine that a first set of RS measurement opportunities may be applicable, for example, if/when the associated DRX configuration is used, and a second set of RS measurement opportunities may be applicable, for example, if/when otherwise. The WTRU may be configured with a plurality of DRX configurations. The WTRU may be configured with an association between a set of RS measurement opportunities and a DRX configuration (e.g., by RRC signaling).

A WTRU may be configured to determine measurement opportunities and/or timing of the measurement opportunities, for example, based on DRX active time. The WTRU may determine that a first set of RS measurement opportunities may be applicable, for example, if/when the WTRU is in DRX active time, and a second set of RS measurement opportunities may be applicable, for example, if/when otherwise.

A WTRU may be configured to determine measurement opportunities and/or timing of the measurement opportunities, for example, based on WUS occasions. The WTRU may determine that a first set of RS measurement opportunities may be applicable, for example, in periods where the WUS may be received (e.g., WUS occasions), and a second set of RS measurement opportunities may be applicable, for example, if/when otherwise.

A WTRU may be configured to determine measurement opportunities and/or timing of the measurement opportunities, for example, based on a WUS. The WTRU may determine that a first set of RS measurement opportunities may be applicable, for example, starting upon reception of a WUS for the WTRU. A first set of RS measurement opportunities may be applicable for a specific (e.g., configurable) period. A period may correspond to a timer. The WTRU may start (or restart) the timer, for example, based on (e.g., upon) reception of a WUS. The WTRU may determine that a second set of RS measurement opportunities may be applicable, for example, if/when otherwise (e.g., if the timer is not running and/or the period has elapsed). The period may (e.g. alternatively) be determined (e.g. implicitly), for example, from the DRX and WUS configuration. The WTRU may determine the period, for example, as the time from or after the WUS occasion to the start of the DRX on duration. The period may be a (pre)defined or a (pre) configured period of time, for example, before the start of the WUS occasion or the DRX on duration. The first set of RS measurement opportunities may depend on an index indicated as part of the WUS. An index may point, for example, to one of a set of (e.g., possible) sets of RS measurement opportunities configured by higher layers.

A WTRU may be configured to determine measurement opportunities and/or timing of the measurement opportunities, for example, based on one or more channel conditions (e.g., RSRP, SINR, RSSI, power headroom, CO and/or CQI). The WTRU may determine that a first set of RS measurement opportunities may be applicable, or may (e.g., more generally) (de)-activate a given RS measurement pattern, for example, if (i) the measured channel condition(s) (e.g., RSRP, SINR, RSSI, PH, CO and/or CQI) or (ii) the change in the measured channel condition(s) since the last measurement is (a) less than a configured threshold, (b) greater than a configured threshold, or (c) within a configured range for the set to be applicable.

A WTRU may be configured to determine measurement opportunities and/or timing of the measurement opportunities, for example, based on speed or level of channel variation (e.g., in terms of fast fading). The WTRU may switch to a certain set of RS measurement opportunities, or may (e.g., more generally) (de)-activate a given RS measurement pattern, for example, if the measured WTRU speed is higher than or lower than a configured threshold. A second set of RS measurement opportunities may be applicable otherwise.

A WTRU may be configured to determine measurement opportunities and/or timing of the measurement opportunities, for example, based on status of beams in the maintained set of beams. The WTRU may determine loss of a maintained beam IDs, for example, due to blocking effects, corner effects, or based on associated measurements below a threshold. The WTRU may (de)-activate a set of RS measurement opportunities associated with the lost beams. The WTRU may (de)-activate a set of RS measurement opportunities associated with the candidate beams for beam realignment. The WTRU may monitor the set of RS measurement opportunities associated with (i) the active beams in the set of maintained beams and/or (ii) the configured set of candidate beams.

A WTRU may be configured to determine measurement opportunities and/or timing of the measurement opportunities, for example, based on downlink reception. The WTRU may determine that a first set of RS measurement opportunities may be applicable, for example, (i) after reception of downlink data or control signaling (e.g., on a subset of DL channels or resources), and/or (ii) upon receiving a dynamic indication (e.g., DCI or MAC control element (CE) to apply the measurement pattern. A second set of RS measurement opportunities may be applicable, for example, otherwise. A first set of RS measurement opportunities may be applicable for a specific period (e.g., based on a configured inactivity timer). The first set of RS measurement opportunities may depend on a priority level associated with the downlink reception or its associated HARQ-ACK, such as a priority indication signaled from DCI or configured by higher layer. A priority level may correspond, for example, to one of a set of possible sets of RS measurement opportunities configured by higher layers. A priority indication may be obtained, for example, from an explicit field of the DCI, from RNTI, from the search space, or from the control resource set (CORESET) where the DCI is decoded.

A WTRU may be configured to determine measurement opportunities and/or timing of the measurement opportunities, for example, based on uplink transmission. The WTRU may determine that a first set of RS measurement opportunities may be applicable, for example, after transmission of uplink data or UCI (e.g., on a certain uplink resource or channels associated with the measurement pattern). A second set of RS measurement opportunities may be applicable, for example, otherwise. A first set of RS measurement opportunities may be applicable for a specific period (e.g., based on a configured inactivity timer). The first set of RS measurement opportunities may depend on a priority level associated with the uplink transmission, such as a priority indication signaled from DCI (e.g., for dynamically scheduled PUSCH) or configured by higher layer (e.g., for a scheduling request or a configured grant).

A WTRU may be configured to determine measurement opportunities and/or timing of the measurement opportunities, for example, based on a change (e.g., a switch) of bandwidth part (BWP). The WTRU may determine that a default set of RS measurement opportunities may be applicable, for example, upon a change of bandwidth part (e.g., by DCI or by timer expiry).

A WTRU may be configured to determine measurement opportunities and/or timing of the measurement opportunities, for example, based on a change (e.g., a switch) of search space sets (e.g., from reception of DCI format 2_0). The WTRU may determine that a first set of RS measurement opportunities may be applicable, for example, for a first group index of a search space set, and that a second set of RS measurement opportunities may be applicable, for example, for a second group index of a search space set, and so on. In some examples, a second set of RS measurement opportunities may have a longer period between each measurement (e.g., for more relaxed BFD activity) compared to the first set of RS measurement opportunities, or vice versa.

A WTRU may perform behavior related to DRX, for example, (e.g. only) if the WUS is not configured. A WTRU may perform behavior related to WUS, for example, (e.g. only) if DRX is not configured.

SSB/CSI-RS periodicity may be aligned with the DRX period, e.g., including switching between long and short DRX. Measurement opportunities for SSB/CSI-RS (or their periodicity) may vary, for example, as a function of the DRX state. In examples, more scheduling activity for a given WTRU on the PDCCH may lead to shorter BFD evaluation periods (e.g., more beam management and oversight), while less scheduling may lead to longer BFD periods. Longer BFD periods may be bounded, for example, by a (e.g., configurable) value. A WTRU may (e.g., dynamically) adapt measurement opportunities (e.g., in time and/or in frequency) for BFD, SSB/CSI-RS measurements in synchronization with DRX, e.g., under gNB control.

A WTRU may perform measurements in the measurement opportunities (e.g., determined as described herein), for example, for the purpose of beam failure detection (BFD).

A WTRU may (e.g. similarly) apply any logic described herein to measurements related to radio link monitoring (RLM), to measurements related to mobility, and/or to measurements related to CSI reporting.

In an example realization of RS measurement opportunities, a WTRU may be configured with multiple CSI measurement resources (e.g., with different periodicities). A WTRU may assume that CSI measurement resources that are present correspond to the currently applicable set, whereby a given set is applicable, for example, if a condition is met.

A set of RS measurement opportunities may be configured, for example, with at least one of the following: (i) an index or identity of the set, (ii) a time domain offset (e.g., a start offset from the slot boundary), (iii) a periodicity (e.g., in slots, symbols, or absolute time), (iv) a frequency domain granularity for which CSI measurements may be (e.g. are) measured (e.g., every physical resource block (PRB), every other PRB, etc.), (v) an associated frequency domain allocation for CSI measurements (e.g., BWP, carrier, subband), (vi) an associated uplink reporting resource or channel (e.g., a PUCCH or PUSCH reporting resource), (vii) associated CSI-RS(s)/CSI-RS resource set(s), (viii) associated DRX configurations or cycles, (ix) a list of associated beam identifiers (IDs) or beam types, (x) applicability to associated WUS(s) or WUS occasions, (xi) inactivity timer(s) (e.g., in slots, symbols, or absolute time), (xii) whether the set of RS opportunities is or may be applied for BFD, and/or (xiii) whether the set may be used as the default configuration.

In examples, a set of RS measurement opportunities may be applied as a mask to a set of resources used for CSI measurement. A WTRU may assume/determine that a resource is present, for example, (e.g., only) if it overlaps in time with the time pattern corresponding to the set of RS measurement opportunities.

A set of RS measurement opportunities may (e.g., alternatively) correspond to a specific group of resources that may be used for CSI measurement, e.g., and that may be identified by an index. An index may be added to the configuration of a (e.g., each) CSI resource configuration, or to the configuration of a (e.g., each) CSI-RS, CSI interference measurement (CSI-IM) or SSB resource. A WTRU may determine or assume that a (e.g., each) resource is present, for example, (e.g. only) if the set of RS measurement opportunities corresponding to the index is applicable, e.g., according to at least one of the examples.

An index may (e.g., alternatively) be added, for example, as part of the configuration of a (e.g., each) CSI report configuration. A WTRU may measure and report according to a CSI report configuration, for example, if the set of RS measurement opportunities corresponding to the index is applicable (e.g., according to at least one of the examples), which may support (e.g., allow) adaptation of the measurement resources and the reporting resources. In an (e.g., alternative) example, an RRC may configure groups of CSI report configurations within a CSI measurement configuration, where a (e.g., each) group may correspond to a set of RS measurement opportunities. A WTRU may (e.g., at any point of time) apply the set of CSI report configurations of the group corresponding to the set of RS measurement opportunities that may be obtained, e.g., according to at least one of the examples.

A CSI report configuration may (e.g., alternatively) comprise/include at least one set of RS measurement opportunities(e.g., including a default set). A (e.g., each) set of RS measurement opportunities may comprise a set resources for channel measurement and sets of resources for interference measurement (e.g., CSI-IM and/or NZP CSI-RS). A WTRU may (e.g., for each CSI report configuration) utilize the resources corresponding to the index identifying the set of RS measurement opportunities, e.g., according to at least one of the examples.

A link may be configured between BFD and DRX. DRX may impact beam management. A WTRU may change the status of a subset of beam states, (de)-activate associated CSI-RS or SSBs, and/or pause/resume associated BFD measurements and procedures, for example, as a function of the DRX state and/or the active DRX configuration. A WTRU may (de)-activate certain beams and associated CSI-RS, for example, as a function of DRX states and/or based on whether certain DRX timers are running. A WTRU may (de)-activate one or more (e.g., certain) beams and/or associated CSI-RS, for example, during DRX inactive times. A WTRU may activate or deactivate one or more (e.g., certain) beams and/or associated CSI-RS, for example, (i) while the DRX inactivity timer is running, (ii) while the WTRU is in active time, (iii) while the on duration is running, (iv) starting a fixed period prior to the on duration, (v) while the DRX short cycle timer is running, (vi) while the DRX retransmission timer is running, (vii) starting a fixed period prior to the WUS occasion, (viii) during the period from (e.g., and including) the WUS occasion to the on duration (e.g., or the end of the on duration), and/or (ix) after satisfying any of the triggers (e.g., as described herein). In examples, a WTRU may measure CSI-RS associated with BFD, for example, even if the WTRU is inactive or during the DRX off period.

A WTRU may change a subset of beam states, (de)-activate associated CSI-RS or SSBs, and/or pause/resume associated BFD measurements and procedures, for example, after receiving (or after a lack of receiving) network signaling associated with DRX or power savings. In examples, a WTRU may (de)-activate certain beams, associated CSI-RS, and/or pause or resume associated BFD measurements and procedures, for example, after receiving a DRX short cycle command, a DRX long cycle command, a WUS, and/or a PDCCH signal. In an (e.g., additional and/or alternative) example, a WTRU may (de)-activate certain beams, associated CSI-RS, and/or pause or resume associated BFD measurements and procedures, for example, after not receiving a life signal or a WUS associated with the beam. A (de)activation may be, for example, for a number of consecutive configured periods (e.g., DRX periods or a separate configured period).

Beam management may have an impact on DRX. A WTRU may transition into a different DRX cycle and/or DRX configuration, pause/resume DRX functionality, and/or (re)-start or stop certain DRX timers, for example, as a function of detecting a beam failure, detecting loss of beam(s), and/or related measurements. A WTRU may turn off or pause DRX, transition into a different DRX cycle (e.g., short DRX), and/or (re)-start the DRX inactivity timer, for example, based on (e.g., upon) detecting a beam failure, measuring a loss of beam(s), and/or measuring a channel condition quantity below a threshold for the set of maintained beams. A WTRU may (re)-start the DRX retransmission timers or the DRX HARQ RTT timers, for example, after measuring a loss of beam(s) or measuring a channel condition quantity below a threshold for the set of maintained beams.

A WTRU may transition into a different DRX cycle and/or DRX configuration, pause/resume DRX functionality, and/or start certain DRX timers, for example, after receiving (or after a lack of receiving) network signaling associated with an active beam in the maintained set of beams. A WTRU may transition into a different DRX cycle and/or DRX configuration, pause/resume DRX functionality, and/or start certain DRX timers, for example, after measuring CSI-RS of a certain set of RS measurement opportunities (e.g., lower or higher than a threshold), receiving an aperiodic CSI-RS request, and/or receiving dynamic signaling associated with the set of RS measurement opportunities.

Beam reestablishment (e.g. after DRX sleep) may impact BFR. A WTRU may measure configured active CSI-RS, for example, during a DRX-beam observation period. A DRX-beam observation period may be, for example, the on duration, a configured period prior to the on duration, a configured period prior to the WUS occasion, and/or during the time between the WUS occasion and the on duration. A WTRU may measure configured active CSI-RS during the DRX-beam observation period, conditioned on, for example, receiving a WUS signaling wake up prior to the on duration and/or expiration of the inactivity timer. A WTRU may measure CSI-RS and/or SSBs associated with the maintained beam set. A WTRU may (e.g., additionally) measure CSI-RS and/or SSBs associated with the candidate beam set, for example, conditioned on the lack of a satisfactory beam (e.g., that meets a configured channel condition measurement threshold) in the maintained beam set.

A WTRU may (i) trigger a BFR (e.g., a new BFR) or beam reestablishment procedure, for example, if the WTRU does not have any satisfactory beam (e.g., that meets a configured channel condition measurement threshold) in the maintained beam set during the DRX-beam observation period and may (ii) (e.g., further) transition into active time or switch DRX cycles. A WTRU may (e.g., further) condition triggering a BFR, for example, based on having at least one beam with a satisfactory measurement in the candidate beam set. A WTRU may (e.g., during the BFR procedure), for example, perform at least one of the following actions: (i) follow a legacy BFR procedure (e.g., as described herein), (ii) transition into active time, (iii) report preferred beam ID(s) on a different serving cell (e.g., using a BFR MAC CE or a PUCCH), and/or (iv) transmit an SRS associated with the preferred beam(s). A WTRU may monitor one or more (e.g., certain) PDCCH resources (e.g., a subset of configured CORESET(s) or search space(s) associated with the indicated preferred beam(s). An association may be configured, for example, by RRC signaling. A WTRU may consider a beam reestablishment or BFR procedure successful, for example, based on (e.g., upon) receiving a response on the downlink. A response may be conditioned for receipt on the PDCCH resources associated with the indicated preferred beams.

DRX may impact a BFD procedure. A WTRU may pause or (re)-start a BFD timer, for example, based on (e.g., upon) going into inactive time (e.g., after the expiry of the DRX inactivity timer or during the DRX sleep opportunity), which may support, for example, maintaining the BFI count before going into sleep, e.g., without resetting the BFI counter. A WTRU may restart the BFD timer at a (e.g., each) CSI-RS occasion (e.g., occasions monitored in connected mode) or a subset of CSI-RS occasions, for example, if the WTRU is in DRX inactive time, e.g., even if the WTRU does not make any CSI measurements during the DRX sleep duration. A WTRU may be configured with a separate value for the BFD timer, which the WTRU may apply, for example, if the WTRU is configured with DRX and if DRX is active. A WTRU may be configured with a separate timer (e.g., a timer in lieu of the BFD timer), which the WTRU may apply for BFD, for example, if the WTRU is configured with DRX, if DRX is active, and/or if DRX is used to rest the BFI counter when C-DRX is used. A WTRU may restart the BFD timer with a value that equals the DRX cycle duration (e.g., period between on durations), for example, upon going into inactive time (e.g., after the expiry of the DRX inactivity timer or during the DRX sleep opportunity). A WTRU may (e.g., alternatively), apply (e.g., only) the BFD timer to the BFD procedure, for example, if the WTRU is in active time and/or if C-DRX is not used or not configured. A WTRU may be configured with a DRX BFI counting timer (e.g., a new DRX BFI counting timer), which the WTRU may apply for BFD, for example, if the WTRU is configured with DRX and/or if the WTRU is inactive. A WTRU may (re)-start the BFD timer or resume the BFD timer if it was paused, for example, after the expiry of the DRX counting timer.

A WTRU may limit counting BFIs to BFIs measured during active time. A WTRU may scale counting a beam failure instance, for example, by a (e.g., certain) ratio related to the DRX period and/or the relative CSI-RS period. A WTRU may apply scaling during DRX on durations and/or after the expiry of the inactivity timer. In examples (e.g., if the CSI period is smaller than the active DRX period), a WTRU may increment the BFI counter, for example, by (active DRX period/CSI-RS period), (active DRX period/max(shortest configured DRX period, CSI-RS period), and/or (active DRX period/an RRC configured period). As a possible illustration, consider a case where a long DRX cycle is 20 ms, a short cycle is 10 ms, and a CSI period is 2 ms. If the WTRU is in long DRX, if the WTRU detects a single BFI, the WTRU may increment the BFI counter by 20/2=10. If the WTRU is in long DRX, upon detecting a BFI, the WTRU may increment the BFI counter by 20/10=2. If "RRC configured period" is used, and for example it is 5 ms, then: if the WTRU is in long DRX, if detecting a BFI, the WTRU may increment the BFI counter by 20/5=4. A WTRU may round counting to an integer, for example, if/when incrementing counting by a scaled value.

BFD may impact DRX operation. A WTRU may perform beam failure detection in a (e.g., each) beam failure detection instance, for example, with (i) one or more periodic CSI-RS resources configured as beam failure detection resources (BFDR) or (e.g., if BFDR is not configured) (ii) the periodic CSI-RS resources and/or SS/PBCH blocks associated with CORESETs (e.g., that the WTRU uses for monitoring PDCCH). A WTRU may perform beam failure detection, for example, if the WTRU is in active time with a C-DRX configuration. Hereafter, (i) beam failure detection resources (BFDR) and (ii) periodic CSI-RS resources and/or SS/PBCH blocks associated with CORESETs may be used interchangeably.

A WTRU may switch between DRX states (e.g., long DRX and short DRX cycles), for example, based on detected beam failure instance(s) (BFIs). The time to detect a connection problem (e.g., beam failure), for example, may be reduced by switching between DRX states. For example, a WTRU may switch from a long DRX cycle to a short DRX cycle to confirm or detect a beam failure. A WTRU may perform beam failure detection (BFD) and recovery associated with DRX. For example, a WTRU may receive one or more configurations (e.g., configuration information in one or more messages) indicating a short DRX cycle, a long DRX cycle, and/or CSI-RS measurements (e.g., to determine BFIs). A WTRU may determine a first number of beam failure instance(s) (BFI), e.g., using a BFI counter value as an example herein, based on one or more CSI-RS measurements during one or more "on" durations or active times of a long DRX cycle. A BFI counter may count BFIs detected during CSI-RS measurements, for example, to determine a first BFI counter value. The WTRU may determine whether the BFI counter value exceeds a first threshold. The WTRU may switch to the short DRX cycle or may suspend DRX for CSI-RS measurements for BFD, for example, based on a condition that the first BFI counter value is greater than the first threshold. The WTRU may measure CSI-RS(s), for example, during one or more "on" durations associated with a short DRX cycle. The WTRU may update the first BFI counter value to a second BFI counter value, for example, based on the measurements. The WTRU may switch to or may resume using the long DRX cycle for CSI-RS measurements associated with BFD, for example, on a condition that the second BFI counter value is less than a second threshold. The WTRU may initiate a beam failure recovery and/or suspend DRX or reset an inactivity timer associated with DRX, for example, on a condition that the second BFI counter is more than a third threshold (e.g., which may indicate detection of a beam failure).

FIG. 3 illustrates an example of detecting beam failure instances at measurement opportunities with different periodicities associated with DRX on durations in multiple DRX cycles with different durations. As shown by example in FIG. 3, variable DRX cycles may include a first (e.g., long) DRX cycle and a second (e.g., short) DRX cycle. A WTRU may be configured to detect beam failure (e.g., BFD) based on a threshold number of BFIs. As shown in FIG. 3, BFIs are indicated with an X and the lack of a BFI is indicated by a checkmark. A number of detected BFIs may be tracked or counted, for example, using a BFI counter (e.g., as shown in FIG. 3). A BFI may be determined/detected and a BFI counter may be incremented, for example, based on a channel condition state determined from measurement of a CSI-RS. As shown by example in FIG. 3, a WTRU may be configured to detect or trigger beam failure based on a threshold of greater than six BFIs or equal to or greater than seven (7) BFIs. Measurement opportunities to detect BFIs, or lack thereof, may occur during on durations in a long DRX cycle and during on durations in a short DRX cycle. The number of BFIs detected (e.g., tracked, for example via the BFI counter) during on durations of long DRX and short DRX cycles is shown as 0, 1, 2, 3, 4, 5, 6, and 7 in FIG. 3. BFIs that occur outside of an on duration during the first long DRX cycle may not be detected or counted by the BFI counter. A WTRU configured as shown in FIG. 3 may detect beam failure and enter BFR faster than a WTRU configured to remain in a long DRX cycle (e.g., as shown by example in FIG. 2).

As shown in FIG. 3, a WTRU may perform a channel state information-reference signal (CSI-RS) measurement(s) during one or more on-durations associated with a first (e.g., long) DRX cycle. The WTRU may determine/track a number of beam failure instances based on the CSI-RS measurement(s). In the example of FIG. 3, the BFI counter may remain at zero (0) if no BFI is detected (e.g., as indicated by a checkmark at "0" in FIG. 3) during an on duration of a long DRX cycle. The WTRU may increment the BFI counter to one (1), for example, based on a detection of a first BFI (e.g., as indicated by an X at "1" in FIG. 3) during an on duration of the long DRX cycle. The WTRU may increment the BFI counter to two (2), for example, based on detection of a second BFI during the on duration of the long DRX cycle (e.g., as indicated by an X at "2" in FIG. 3).

The WTRU may switch to a second (e.g., short) DRX cycle, for example, based on the determined number of beam failure instances (e.g., in comparison to a switch threshold). The WTRU may be configured to switch between DRX cycles (e.g., long and short DRX cycles), for example, based on a switch threshold number of BFIs (e.g., as counted by the BFI counter). As shown by example in FIG. 3, a WTRU may be configured to switch from a long DRX cycle to a short DRX cycle if/when the BFI counter value is greater than one (1) BFI. For example, the WTRU may (e.g., as shown in FIG. 3) switch from a long DRX cycle to a short DRX cycle if/when the BFI counter value is two (2)

The WTRU may perform a CSI-RS measurement during an on-duration associated with the second (e.g., short) DRX cycle. The rate of measurement and/or measurement opportunities to detect BFIs may increase by switching to short DRX cycles, e.g., which may permit a WTRU to detect a beam failure faster (e.g., in a shorter period of time) than if the WTRU remained in a long DRX cycle (e.g., as shown by example in FIG. 2). The WTRU may update the number of beam failure instances based on additional CSI-RS measurement(s). For example (e.g., as shown in FIG. 3), the BFI counter may increment to three (3) based on detection of a third BFI (e.g., as indicated by an X at "3" in FIG. 3) during an on duration of the first short DRX cycle. Measurement(s) of CSI-RS(s) may continue during on durations of the short cycle DRX. The WTRU may continue to update the number of beam failure instances based on CSI-RS measurement(s). For example (e.g., as shown in FIG. 3), the BFI counter may update the count to 4, 5, 6, and 7 BFIs (e.g., at "4," "5," "6," and "7" respectively) associated with the on durations of the short DRX cycle.

The WTRU may switch to a non-DRX operation, for example (e.g., as shown in FIG. 3), based on the determined number of beam failure instances, e.g., in comparison to a BFD threshold. For example, the WTRU may switch to a non-DRX operation on a condition that the number of beam failure instances is equal to or greater than a BFD threshold (e.g., in the example of FIG. 3, greater than six (6) BFIs or equal to seven (7) BFIs). The non-DRX operation may include, for example (e.g., as shown in FIG. 3), suspending DRX, resetting or starting a DRX inactivity timer, and/or entering active time mode.

The WTRU may switch (e.g., switch back) from the second (e.g., short) DRX cycle to the first (e.g., long) DRX cycle, for example, if/when (e.g., on a condition that) the number of beam failure instances associated with the second DRX cycle is less than a second threshold, which may be based on the number of BFIs detected during a certain (e.g., specified, determined, or configured) number of cycles of the second DRX cycle. For example, the WTRU may switch (e.g., switch back) from the second (e.g., short) DRX cycle to the first (e.g., long) DRX cycle if/when the BFI counter is less than seven (7) (e.g., equal to six or fewer) BFIs after a configured number of cycles of the second (e.g., short) cycle.

The WTRU may determine and/or receive (e.g., from a network device) configuration information, which may include, for example, one or more of the following: the first (e.g., long) DRX cycle, the second (e.g., short) DRX cycle, a timing associated with CSI-RS measurement in the first DRX cycle, a timing associated with CSI-RS measurement in the second DRX cycle, the first DRX cycle switch threshold, the first (e.g., BFD) threshold, the second (e.g., non-DRX) threshold, the second DRX cycle switch threshold, and/or the like.

The DRX inactivity timer may be reset, for example, based on the beam failure detection status (e.g., as shown by example in FIG. 3). In examples, a WTRU may reset the DRX inactivity timer, for example, if one or more of following conditions are met: (i) the number of beam failure instances (BFIs) is larger than a threshold, where the threshold may be configured or determined independently from the maximum BFI number to declare beam failure (e.g., the first BFI threshold for inactivity time reset may be smaller than the second BFI threshold for BF declaration); (ii) beam quality of the beam failure detection resources is below a threshold, which may be different from Qout,LR (e.g., used to determine beam failure); (iii) the rest of BFDRs within active time (e.g., before inactivity timer expiry) are not enough to declare beam failure; and/or (iv) there is no BFDR resource before inactivity timer expiry and current BFI counter is larger than a first threshold and less than a second threshold (e.g., the WTRU may reset the inactivity timer if resetting the timer can result in detecting a beam failure upon counting a number of BFIs in upcoming BFDRs within an extra inactivity timer period).

An inactivity timer may (e.g., alternatively) be on-hold, for example, based on the beam failure detection status (e.g., when one or more of the foregoing conditions are met).

A WTRU may (i) suspend DRX, (ii) ignore DRX off-duration (or inactive time), and/or (iii) consider itself in active time, and monitor a PDCCH search space, for example, if a WTRU declared beam failure during active time. A WTRU may (e.g., in this scenario) skip monitoring one or more PDCCH search spaces that may be monitored by the WTRU in Active time. The WTRU may (i) monitor a PDCCH search space (e.g., configured as beam recovery search space), for example, after new candidate beam indication (e.g., using PRACH or a BFR MAC CE), and/or (ii) monitor any search space associated with a beam recovery procedure (e.g., a common search space for RAR reception), for example, after transmitting a contention-based random access (CBRA) preamble part of the RA initiated by BFR.

A first set of PDCCH search spaces may be monitored in active time and a second set of PDCCH search spaces may be monitored in inactive time. One or more of following may apply: (i) The second set of PDCCH search spaces may be an empty set (e.g., if the BFI counter is less than the maximum); (ii) The second set of PDCCH search spaces may include beam recovery search space (e.g., if the BFI counter reached the maximum count); and/or (iii) The second set of PDCCH search space may include beam recovery search space (e.g., if the new candidate beam has been indicated and the WTRU has not received a confirmation from the gNB).

Beam recovery search space may be a PDCCH search space, for example, with recoverySearchSpaceId configured via a higher layer signaling.

A WTRU may (i) suspend DRX, (ii) ignore DRX operation, or (iii) consider itself in active time, and operate as non-DRX operation, for example, if the BFI counter is higher than a threshold. A WTRU may resume DRX operation, for example, if the BFI counter is reset (e.g., the measurement of beam failure detection resource is higher than a threshold Qin, LR). One or more of following may apply: (i) The threshold may be a fixed number (e.g., 1) or configured number which may be same or different from the maximum BFI number for BF declaration; and/or (ii) a WTRU may (e.g. if the BFI counter is equal to or greater than the threshold) operate as non-DRX operation, for example, until the WTRU receives confirmation of the new candidate beam indicated to the gNB. The confirmation of the new candidate beam may be an activation for a TCI state via higher layer configuration or an explicit indication in DCI with C-RNTI or MCS-C-RNTI (e.g., on a recovery search space).

A WTRU may operate in DRX operation (e.g., monitor PDCCH in Active time and skip monitoring PDCCH in inactive time), for example, if BFI counter <threshold. The WTRU may operate in non-DRX operation (e.g., monitor PDCCH always), for example, if BFI counter >=threshold. The threshold may be a predefined number (e.g., 0) or may be configured.

One or more following WTRU behaviors may be used, for example, based on whether a BFI counter is or is not less than threshold.

In examples (e.g., where BFI counter <threshold), for example: (i) a WTRU may monitor one or more PDCCH search spaces configured in active time and the WTRU may sleep (e.g., skip monitor PDCCH) in inactive time; (ii) a WTRU may measure one or more beam failure detection resources in Active time and skip measuring configured beam failure detection resources in inactive time; and/or (iii) an inactivity timer may not be reset due to beam failure detection procedure.

In examples (e.g., where BFI counter >=threshold), for example: (i) a WTRU may monitor (a) a PDCCH search space in inactive time (e.g., for recovery) or (b) all configured PDCCH search spaces in inactive time and the PDCCH search space (e.g., for recovery), for example, after the WTRU sends a new candidate beam index via PRACH or a recovery request signal (e.g., a BFR MAC CE); (ii) a WTRU may measure beam failure detection resources in inactive time; (iii) inactivity time may be reset (e.g., based on beam failure detection status); (iv) a WTRU may report to gNB that the BFI counter is larger than or equal to the threshold, for example, by transmitting a signal (e.g., UCI on PUCCH, UCI on PUSCH, or an SR) for the report; and/or (v) a WTRU may monitor (e.g., generally) monitor PDCCH search spaces and CORESETs (e.g., as in BFD when DRX is not configured).

A measurement threshold may be a function of beam management. A WTRU may be configured with measurement configurations that may be specific to a beam characteristic (e.g., beam type, beam width, beam ID, or the likes). For example, a WTRU may perform (e.g., specific) link and/or connectivity management procedures as a function of a (e.g., specific) beam configuration. A WTRU may be configured with a default beam and may use the associated configuration, for example, if no other beam is selected (e.g., for scheduled transmission(s)). A WTRU may use a default, for example, if/when the time alignment timer (TAT) is not running, if/when the WTRU is in DRX Inactive time, and/or under a period of limited (e.g., if any) scheduling activity for unicast transmissions. A measurement configuration may include, for example, configurations related to beam management, configurations for radio link monitoring (RLM), configurations for mobility management and/or measurement reporting, configurations for measurements related to CSI reporting, and/or configurations for sensing in unlicensed spectrum (e.g., energy detection level, sensing duration).

DRX configurations may be beam-specific. For example, a WTRU may be configured with beam-specific, beam index specific, beam ID specific, and/or beam type specific DRX configurations. A WTRU may determine the applicable DRX configuration, for example, as a function of the beam used for reception of the PDCCH control channel for a given cell. A WTRU may determine the applicable DRX configuration, for example, when a beam is first established.

Power efficient measurements have been described for high frequency operations. A wireless transmit/receive unit (WTRU) may determine measurement occasions as a function of scheduling activity and beam configuration. A WTRU may determine measurement occasions for beam failure detection (BFD), radio link monitoring (RLM), and/or mobility as a function of discontinuous reception (DRX) and/or BFD configuration. A WTRU may determine that a first set of reference signal (RS) measurement opportunities are applicable based on a first condition (e.g., if/when a DRX/BFD/channel state information (CSI) condition is met) and a second set of RS measurement opportunities are applicable based on a second condition (e.g., if/when the DRX/BFD/CSI condition is not met). A WTRU may be configured with multiple sets of CSI-RS measurement opportunities (e.g., with different periodicities). A WTRU may assume a given set is applicable, for example, if a DRX/BFD/CSI condition is met. A WTRU may determine DRX operation or non-DRX operation, for example, based on whether a BFI counter is or is not less than a threshold. A WTRU may reset an inactivity timer, for example, based on one or more BFD statuses (e.g., beam failure instance (BFI) counter >threshold and no BFD resource before inactivity timer expiry). A WTRU may pause, disable, or (re)-start the BFD timer, for example, upon going into inactive time. A WTRU may change beam states, (de)-activate associated CSI-RS, and/or pause/resume associated BFD, for example, as a function of the DRX state/configuration or related signaling. A WTRU may transition to a different DRX cycle/configuration, pause/resume DRX functionality, and/or (re)-start/stop one or more DRX timers, for example, as a function of detecting a beam failure, loss of beam(s), or related measurements. A WTRU may trigger a BFR/beam reestablishment procedure (e.g., a new BFR/beam reestablishment procedure), for example, if the WTRU does not have a satisfactory beam during a DRX-beam observation period.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising a processor configured to:

receive a radio resource control (RRC) message, the RRC message comprising measurement configuration information for beam failure detection, the measurement configuration information for beam failure detection indicating one or more reference signals to be used for performing beam failure detection measurements, wherein the RRC message comprises information indicative of at least a first threshold value and a second threshold value used for determining whether to use a relaxed second beam failure detection measurement period;

perform one or more first measurements to evaluate for beam failure detection in accordance with a first beam failure detection measurement period;

determine that an L1 channel quality measurement value is greater than the first threshold value;

determine that a change in reference signal received power (RSRP) is less than the second threshold value, wherein the change in RSRP corresponds to an L3/mobility-based measurement value;

determine to evaluate for beam failure detection in accordance with the second beam failure detection measurement period based on the L1 channel quality measurement value being greater than the first threshold value and based on the change in RSRP being less than the second threshold value, wherein the second beam failure detection measurement period is greater than the first beam failure detection measurement period; and perform one or more second measurements to evaluate for beam failure detection in accordance with the second beam failure detection measurement period based on the L1 channel quality measurement value being greater than the first threshold value and based on the change in RSRP being less than the second threshold value.

2. The WTRU of claim 1, wherein the measurement configuration information comprises information indicative of at least a second third threshold value used for determining whether to use a relaxed second radio link monitoring measurement period, and the processor is further configured to:

perform one or more third measurements in accordance with a third first radio link monitoring measurement period;

determine, based on the first and second threshold values, that the one or more channel conditions for using the second beam failure detection measurement period are satisfied;

determine, based on the third threshold value, that one or more channel conditions are met for using a second radio link monitoring measurement period; and perform one or more fourth measurements in accordance with a second radio link monitoring measurement period based on the first, second, and third threshold values being satisfied, wherein the second radio link monitoring measurement period is greater than the first radio link monitoring measurement period.

3. The WTRU of claim 1, wherein the one or more first measurements are performed on at least a synchronization signal block (SSB).

4. The WTRU of claim 1, wherein the one or more first measurements are performed on at least a channel state information reference signal (CSI-RS).

5. The WTRU of claim 1, wherein the processor is further configured to:
 determine that the performed beam detection failure measurements are outside the configured beam quality thresholds;
 increment a beam failure instance counter based on determining that the performed beam detection failure measurements are outside the configured beam quality thresholds;
 determine that the beam failure instance counter has reached a maximum number of beam failure instances;
 initiate a random access procedure based on determining that the beam failure instance counter has reached the maximum number of beam failure instances, wherein the WTRU is configured to utilize a contention-free random access preamble configured for beam failure detection in the random access procedure.

6. The WTRU of claim 1, wherein the processor is further configured to perform the one or more second measurements in accordance with the second beam failure detection measurement period based on determining that a change in a synchronization signal block (SSB) RSRP measurement is less than a configured threshold value.

7. The WTRU of claim 1, wherein the second beam failure detection measurement period is based on a discontinuous reception (DRX) period.

8. The WTRU of claim 1, wherein the processor is configured to:
 determine that the performed beam detection failure measurements are outside the configured beam quality thresholds;
 increment a beam failure instance counter based on determining that the performed beam detection failure measurements are outside the configured beam quality thresholds; determine that the beam failure instance counter has reached a maximum number of beam failure instances; and
 transmit a medium access control (MAC) control element (CE) based on determining that the beam failure instance counter has reached the maximum number of beam failure instances.

9. The WTRU of claim 1, wherein the RRC message indicates a periodicity, a time domain offset, and frequency domain information for the one or more reference signals to be used for performing the beam failure detection measurements.

10. The WTRU of claim 1, wherein the RRC message indicates respective reference signals associated with each of a plurality of candidate beams.

11. A method implemented by a wireless transmit/receive unit (WTRU), the method comprising:
 receiving a radio resource control (RRC) message, the RRC message comprising measurement configuration information for beam failure detection, the measurement configuration information for beam failure detection indicating one or more reference signals to be used for performing beam failure detection measurements, wherein the RRC message comprises information indicative of at least a first threshold value and a second threshold value used for determining whether to use a relaxed second beam failure detection measurement period;
 performing one or more first measurements to evaluate for beam failure detection in accordance with a first beam failure detection measurement period;
 determining that an L1 channel quality measurement value is greater than the first threshold value;
 determining that a change in reference signal received power (RSRP) is less than the second threshold value, wherein the change in RSRP corresponds to an L3/mobility-based measurement value;
 determining to evaluate for beam failure detection in accordance with the second beam failure detection measurement period based on the L1 channel quality measurement value being greater than the first threshold value and based on the change in RSRP being less than the second threshold value, wherein the second beam failure detection measurement period is greater than the first beam failure detection measurement period; and
 perform one or more second measurements to evaluate for beam failure detection in accordance with the second beam failure detection measurement period based on the L1 channel quality measurement value being greater than the first threshold value and based on the change in RSRP being less than the second threshold value.

12. The method of claim 11, wherein the measurement configuration information comprises information indicative of at least a third threshold value used for determining whether to use a relaxed second radio link monitoring measurement period, and
 the method further comprising:
 performing one or more third measurements in accordance with a first radio link monitoring measurement period;
 determining, based on the first and second threshold values, that the one or more channel conditions for using the second beam failure detection measurement period are satisfied;
 determining, based on the third threshold value, that one or more channel conditions are met for using a second radio link monitoring measurement period; and
 performing one or more fourth measurements in accordance with a second radio link monitoring measurement period based on the first, second, and third threshold values being satisfied, wherein the second radio link monitoring measurement period is greater than the first radio link monitoring measurement period.

13. The method of claim 11, wherein the one or more first measurements are performed on at least a synchronization signal block (SSB).

14. The method of claim 11, wherein the one or more first measurements are performed on at least a channel state information reference signal (CSI-RS).

15. The method of claim 11 further comprising:
 determining that the performed beam detection failure measurements are outside the configured beam quality threshold;

incrementing a beam failure instance counter based on determining that the performed beam detection failure measurements are outside the configured beam quality thresholds;

determining that the beam failure instance counter has reached a maximum number of beam failure instances; and initiating a random access procedure based on determining that the beam failure instance counter has reached the maximum number of beam failure instances, wherein the WTRU utilizes a contention-free random access preamble configured for beam failure detection in the random access procedure.

16. The method of claim 11, wherein performing the one or more second measurements in accordance with the second beam failure detection measurement period is based on determining that a change in a synchronization signal block (SSB) RSRP measurement is less than a configured threshold value.

17. The method of claim 11, wherein the second beam failure detection measurement period is based on a discontinuous reception (DRX) period.

18. The method of claim 11 further comprising:
determining that the performed beam detection failure measurements are outside the configured beam quality threshold;

incrementing a beam failure instance counter based on determining that the performed beam detection failure measurements are outside the configured beam quality threshold;

determining that the beam failure instance counter has reached a maximum number of beam failure instances; and transmitting a medium access control (MAC) control element (CE) based on determining that the beam failure instance counter has reached the maximum number of beam failure instances.

19. The method of claim 11, wherein the RRC message indicates a periodicity, a time domain offset, and frequency domain information for the one or more reference signals to be used for performing the beam failure detection measurements.

20. The method of claim 11, wherein the RRC message indicates respective reference signals associated with each of a plurality of candidate beams.

* * * * *

UNITED STATES PATENT AND TRADEMARK OFFICE
CERTIFICATE OF CORRECTION

PATENT NO. : 12,279,140 B2  
APPLICATION NO. : 18/679601  
DATED : April 15, 2025  
INVENTOR(S) : Faris Alfarhan et al.

Page 1 of 1

It is certified that error appears in the above-identified patent and that said Letters Patent is hereby corrected as shown below:

In the Claims

In Claim 2: Column 32, Line 51, delete "second".

In Claim 2: Column 32, Line 56, delete "third".

Signed and Sealed this  
Twenty-seventh Day of May, 2025

Coke Morgan Stewart  
*Acting Director of the United States Patent and Trademark Office*